United States Patent
Shaik et al.

(10) Patent No.: US 10,904,765 B2
(45) Date of Patent: Jan. 26, 2021

(54) METHOD FOR OPERATING A WIRELESS COMMUNICATION DEVICE

(71) Applicant: Gemalto M2M GmbH, Munich (DE)

(72) Inventors: Altaf Shaik, Berlin (DE); Lars Wehmeier, Falkensee (DE)

(73) Assignee: THALES DIS AIS DEUTSCHLAND GMBH, Munich (DE)

( * ) Notice: Subject to any disclaimer, the term of this patent is extended or adjusted under 35 U.S.C. 154(b) by 156 days.

(21) Appl. No.: 16/099,505

(22) PCT Filed: Jun. 1, 2017

(86) PCT No.: PCT/EP2017/063388
§ 371 (c)(1),
(2) Date: Nov. 7, 2018

(87) PCT Pub. No.: WO2017/215946
PCT Pub. Date: Dec. 21, 2017

(65) Prior Publication Data
US 2019/0110205 A1    Apr. 11, 2019

(30) Foreign Application Priority Data
Jun. 13, 2016 (EP) .................................. 16174218

(51) Int. Cl.
*H04L 29/06* (2006.01)
*H04W 12/12* (2009.01)
(Continued)

(52) U.S. Cl.
CPC ...... *H04W 12/1202* (2019.01); *H04B 17/318* (2015.01); *H04L 63/0876* (2013.01);
(Continued)

(58) Field of Classification Search
CPC ....... H04W 12/1202; H04W 36/00835; H04W 12/06; H04W 12/12; H04W 36/0061;
(Continued)

(56) References Cited

U.S. PATENT DOCUMENTS 7,716,740 B2 * 5/2010 Robert ................ H04L 63/1408
726/23
9,191,823 B2 * 11/2015 Rieger .................. H04W 12/12
(Continued)

FOREIGN PATENT DOCUMENTS

| EP | 2003818 A1 * | 12/2008 | ............. H04L 63/30 |
| EP | 2003818 A1 | 12/2008 | |
| EP | 2661113 A1 | 11/2013 | |

OTHER PUBLICATIONS

International Search Report (PCT/ISA/210) dated Jul. 18, 2017, by the European Patent Office as the International Searching Authority for International Application No. PCT/EP2017/063388.
(Continued)

*Primary Examiner* — Jayesh M Jhaveri
(74) *Attorney, Agent, or Firm* — Buchanan Ingersoll & Rooney PC

(57) ABSTRACT

A method for operating a wireless communication device in association with a first base station comprises: determining further suitable base stations. In case at least one suitable second base station characteristically different from the first base station is found, checking if a cell identifier of the second base station is listed in a neighbor cell list received from the first base station, and checking signaling power of the second base station. The second base station is rated as a fake base station if measured signaling power is significantly higher than the signaling power of the first base station, and the cell identifier of the second base station is not listed in the neighbor cell list. If the rating of the second
(Continued)

base station as a fake base station is above a predetermined threshold: deleting second base station from a list of suitable base stations.

15 Claims, 5 Drawing Sheets

(51) Int. Cl.
  *H04W 36/00* (2009.01)
  *H04W 48/20* (2009.01)
  *H04B 17/318* (2015.01)
  *H04W 48/16* (2009.01)

(52) U.S. Cl.
  CPC ..... *H04L 63/1466* (2013.01); *H04W 36/0061* (2013.01); *H04W 36/00835* (2018.08); *H04W 48/16* (2013.01); *H04W 48/20* (2013.01)

(58) Field of Classification Search
  CPC ..... H04W 48/16; H04W 48/20; H04W 24/10; H04B 17/318; H04L 63/0876; H04L 63/1466; H04L 29/06
  See application file for complete search history.

(56) References Cited

U.S. PATENT DOCUMENTS

| | | | | |
|---|---|---|---|---|
| 9,867,039 | B2* | 1/2018 | Wang | H04W 12/1202 |
| 2010/0291876 | A1* | 11/2010 | Hariharan | H04W 72/082 |
| | | | | 455/63.1 |
| 2011/0151833 | A1* | 6/2011 | Snider | H04W 12/1008 |
| | | | | 455/410 |
| 2011/0201332 | A1* | 8/2011 | Siomina | H04W 64/00 |
| | | | | 455/434 |
| 2014/0018059 | A1* | 1/2014 | Noonan | H04W 4/021 |
| | | | | 455/419 |
| 2015/0140997 | A1* | 5/2015 | Goldfarb | H04W 24/08 |
| | | | | 455/424 |
| 2016/0234757 | A1* | 8/2016 | Somasundaram | H04W 88/10 |
| 2016/0309332 | A1* | 10/2016 | Norrman | H04W 24/08 |
| 2016/0381545 | A1* | 12/2016 | Wang | H04W 12/1208 |
| | | | | 455/434 |

OTHER PUBLICATIONS

Written Opinion (PCT/ISA/237) dated Jul. 18, 2017, by the European Patent Office as the International Searching Authority for International Application No. PCT/EP2017/063388.

* cited by examiner

METHOD FOR OPERATING A WIRELESS COMMUNICATION DEVICE

FIELD OF THE INVENTION

The present invention relates to a method for operating a wireless communication device in a cellular network.

The invention also pertains to a wireless communication device using said method.

BACKGROUND OF THE INVENTION

Generally, in the field of wireless communication according to wireless cellular technology standards like 3GPP (GSM, UMTS, LTE, etc.) there is a growing problem of illicitly acting users trying to interfere with wireless communication devices at their most vulnerable component: the air interface. It is known that those interferences comprise in particular fake base stations, like IMSI catchers, which pretend towards a wireless communication device to belong to a certain cellular network. Thus instead of providing a service the IMSI catcher allows recording and locating wireless communication devices resp. their identity represented by the SIM card. Known fake base stations are even capable of acting as man-in-the-middle to tap connections to other parties.

Those vulnerabilities are in particular known in cellular networks supporting 2G technology standards, like GSM, GPRS and EDGE, while it was by now assumed that for latter generations of cellular networks, in particular 3G (UMTS) and 4G (LTE) those shortcoming should be solved through the security measures in terms of mutual authentication as part of the network architecture.

However, meanwhile are guidelines publicly available with that a fake base station for a LTE network, a so-called fake eNodeB, can be created, which is able to receive from wireless communication devices at least non-authenticated messages that are needed for normal attach and radio resource control (RRC).

This situation is especially a problem in the growing field of machine to machine (M2M) communication, where in many cases stationary devices, e.g. metering devices, vending machines or home security appliances are used. These devices cannot move away in case of being caught by a fake base station: this situation could eventually mean a denial-of-service attack. In particular in conjunction with home security systems it is obvious how striking such an attack would be.

By now known wireless communication devices operating in LTE have no means to figure out that they were trapped or about to be trapped into a fake base station and would therefore be an easy catch.

It is therefore the goal of present invention to overcome the mentioned shortcomings of presently known wireless communication devices and to propose a solution for a wireless communication device to detect the situation that a fake base station might affect the wireless communication device and prevent it from camping on the fake base station.

Further alternative and advantageous solutions would, accordingly, be desirable in the art.

SUMMARY OF THE INVENTION

For this it is according to a first aspect of the invention suggested a method to operate a wireless communication device according to claim 1. It is further suggested according to a second aspect of the invention a wireless communication device according to claim 11.

According to the first aspect of the invention it is proposed a method for operating a wireless communication device configured to operate in a cellular network comprising a plurality of base stations, the wireless communication device operating in association with a first base station,
the method comprising the steps for the wireless communication device of:
  determining further suitable base stations,
in case at least one suitable second base station different from the first base station is found,
  checking if cell identifier of the second base station is listed in a neighbor cell list received from the first base station, and
  checking signaling power of second base station,
  rating second base station as fake base station in case measured signaling power is significantly higher than the signaling power of the first base station, and the cell identifier of the second base station is not listed in said neighbor cell list,
in case of the rating of the second base station as fake base station is above a predetermined threshold:
  deleting second base station from list of suitable base stations.

The inventive method relates to a wireless communication device operating with a base station of a cellular network. The cellular network in particular is supporting advanced cellular technology standards like 3G and 4G or beyond, which in theory should be robust against attacks on the air interface due to mutual authentication. As shown before, this theory does not hold in practice, as there are still operations between the wireless communication device and the base station that are not protected, and exactly here the attackers jump in. One of these operations is the cell reselection that is the change from one base station to another, preferably in case the wireless communication device is detecting a base station that is better suitable for the data transmissions envisaged for the wireless communication device.

The inventive method mainly, but not only, has in mind wireless communication devices operating stationary. These are in particular prone of such attacks, as here a denial of service situation might happen, and the wireless communication device cannot move away.

Such stationary wireless communication devices are in particular machine type communication devices such as home security devices, vending machines, metering devices or the like.

The inventive method starts with the wireless communication device which is already camping on a base station of the cellular network. The base station is a real one that means data transmissions in connection sessions are possible. As part of normal operation the wireless communication device operating in idle mode is regularly checking for further suitable base stations in the surrounding vicinity. This task is part of the so-called cell re-selection. It is designated to assure that a wireless communication device is continuously camping on suitable base stations, in case of an incoming call or setting up a data transmission session.

Also stationary wireless communication devices need to carry out such procedures—preferably less frequent than mobile devices—at least in order to figure out changes in the topology of the cellular network.

The wireless communication device hence maintains and populates a list of potentially suitable base stations whose signals can be retrieved by the transceiver of the wireless communication device. According to the inventive method this list, resp. a list associated to the first list, further has a rating for each detected base station which indicates the likelihood if the base station is a fake base station.

The suitability of base stations in the surrounding of a wireless communication device is checked by a couple of determination steps. One is the check for the physical reception conditions like the received signal strength of the signals transmitted base station, resp. the signal to noise ratio which reaches the receiver circuitry of the wireless communication device.

A second determination step considers information broadcasted by the base station. First the base station needs to belong to the same cellular network, resp. network operator. Second it needs to allow the wireless communication device to camp on the base station. Typically said broadcast comprises system information blocks which provide the necessary information for a wireless communication device in order to decide whether the base station is considered for a cell reselection.

One of this information is the cell identifier. The currently active base station, that is the base station the wireless communication device is currently camping on, also provides information to the camping wireless communication devices, including a neighbor cell list. This is typically part of the system information blocks of the active base station. The neighbor cell list contains the cell identifier of the base stations in the neighborhood of the active base station.

According to the inventive method the wireless communication device reads the cell identifier of the neighboring base station, in the following the second base station, and checks if the cell identifier can be found in the neighbor cell list of the active base station.

Depending on the technology standard of the base station the likelihood of a fake base station is rated quite high in case of a missing cell identifier in the neighbor cell list. For 3G cells it is higher than for 4G cells, as here the concept of self-organizing networks (SON) allows for neighbor base stations not yet listed in the neighbor cell list.

To improve the reliability of the fake base station's rating it is therefore suggested according to present inventive method to further check the signaling power of the second base station.

What originally is used as a measure to determine the suitability of a base station is in this method taken as an indicator for a fake base station. This is because it is known that fake base station tend to exaggerate with the signaling power, on the one hand in order to make themselves more attractive for camping than the 'real' base stations, on the other hand because it is usually placed near to the wireless communication device which is supposed to be attacked, e.g. a home security system.

When the measured signaling power of the second base station is significantly higher than that of the currently active base station, then the rating of the second base station is further increased.

The signaling power of a base station is significantly higher than that of another base station at least when it is outside of the normal variance of the signaling power. At minimum the signaling power is that high, that according to suitability rules the wireless communication device would make a cell reselection to the second base station. Preferably an increase of at least 20% can be expected. Preferably this increase is detected by means of an instant rise. Instant rise means, that such measured base station was not there before, consequently new.

When all these conditions apply, then—at least in an initial stage of the proposed inventive method—it is assumed that the second base station is a fake base station. In any case the rating is composed of a plurality of checked criteria.

It is of paramount importance that in that case the wireless communication device does not reselect to the second base station, although the suitability criteria would indicate so.

For doing so the base station is discarded. That in particular means that the fake base station is marked in the list as not to be used. Alternatively it is deleted from the list, and/or put on a blacklist in order to not consider this fake base station again as a valid suitable base station.

The proposed inventive method advantageously solves the task to avoid that a wireless communication device is trapped into a fake base station, although from the pure suitability criteria it would need to. In particular for stationary devices this is advantageous; as it is assured that the connection is maintained even if the analyzed second base station is erroneously rated as a fake base station.

Furthermore with a certain level of rating it is moreover possible to fine tune how careful the wireless communication device is able to protect itself from being trapped by a fake base station.

In another preferred embodiment the rating is made even more solid. According to that it is proposed a method where the wireless communication device having memorized a set of system information blocks received from the first base station, the method further comprising the step of:

retrieving a set of system information blocks broadcasted by the second base station, and increasing the rating of the second base station as fake base station, when the tracking area identifier received with the set of system information blocks is different from the tracking area identifier received from the first base station.

This preferred embodiment relates to further information retrieved from the system information broadcast of the second base station, which is analyzed before a potential reselection to the base station.

In this embodiment it is additionally analyzed the tracking area identifier. This embodiment relates to LTE networks, where all base stations are organized in tracking areas, mainly for network internal routing purposes. The tracking area identifier is consequently provided with the system information.

In particular for a stationary device it is extremely unlikely that it is situated on the border of the tracking area, in particular when it previously did not notice this situation. Hence a different tracking area is an indication, that a fake base station is present, in particular as the attacker wishes to receive a tracking area update request from the attacked wireless communication device.

Such by setting a random tracking area identifier the wireless communication device implementing this embodiment of the inventive method is another indication that it is a fake base station. Consequently this indication is used to further increase the rating about the second base station being a fake base station.

In another preferred embodiment it is further proposed an increasing of the rating of second base station as fake base station in case of receiving with the set of system information blocks from the second base station an empty neighbor cell list.

As mentioned above the active base station is providing with its system information a neighbor cell list. The neighbor cell list is an indication for the wireless communication device to analyze better suited base stations than the cell where it is currently camping on. This is also expected from the second base station.

It is obviously not in the interest of a fake base station to let the trapped wireless communication device reselect to another base station. In particular when the wireless communication device wants to set up a communication e.g. to a remote service center, it will notice that this is not working well. Hence a reselection to a neighbor cell indicated by the neighbor cell list would be the option of choice.

Hence, when the wireless communication device notices this empty neighbour cell list from a second base station, this is another indication, that this is a fake base station. In this case, the rating of the second base station as fake base station is increased as well.

With this additional criterion the reliability of the rating is further improved.

According to another embodiment it is further proposed increasing the rating of second base station as fake base station in case of receiving with the set of system information blocks capabilities from the second base station which materially differ from the capabilities contained in the set of system information blocks received from the first base station.

With this embodiment it is further checked the system information of the second base station, in particular in comparison with the system information relating to capabilities of the currently active base station. For doing so, the system information of the currently active base station is preferably stored and upon reception of the system information from the second base station compared with the stored system information.

System information are according to the technology standards organized in system information blocks (SIBs), with a given structure of data fields. The most important data fields are located in the SIB1, which is broadcasted most frequently.

Base stations located in proximity to each other normally would not differ too much, as many information like tracking area identifier, MCC/MNC, neighbor cell identifiers etc. should be the same or at least similar. If the system information instead differs materially, in particular in case the majority of fields differ, this is another indication of a fake base station.

A peculiar way of differing system information is proposed according to another embodiment. According to that it is proposed that the system information materially differ when at least one of the set of system information blocks received from the first base station is missing in the set of system information blocks received from the second base station.

Here it is detected that a second base station does completely omit some system information blocks. In this case it is rated as materially differing system information blocks according to the previous embodiment which is an indication for a fake base station.

The same applies to a second base station broadcasting system information blocks that are mainly empty or have less parameters provided.

Further relevant and suspicious information retrieved with the system information blocks is for LTE based base stations that they send the "absolute priority based cell reselection", which relates to a priority based reselection, rather than suitability based. It is obvious that for fake base stations it would be advantageous if they can present themselves to the attacked wireless communication devices as priority base station. Moreover it induces wireless communication devices to check neighbor base stations for reselection, although it would normally not do so.

Although this is a regular and standard-compliant indication in the system information blocks, it still—together with the other criteria indicated above—is a hint for increasing the rating of the second base station as fake base station.

According to another preferred embodiment it is suggested that the wireless communication device comprises a memory and is further configured to write in memory a cell reference of each base station the wireless communication device camped on, further comprising the step of increasing the rating of second base station as fake base station in case of receiving a cell reference of the second base station which is not stored in said memory.

With this embodiment it is foreseen to maintain in the wireless communication device a list of previously visited base stations. In this list each base station, the wireless communication device has camped on, is added, at least by memorizing the cell reference, preferably also other parameter, like a value indicating the signal strength, the tracking area ID, and/or a time stamp of visit. For a mobile, that is: moving device it is preferable to define a maximum number of stored base stations. Preferably the base station which is stored the longest time resp. visited the longest time ago will be removed when the maximum number is reached.

For a stationary wireless communication device this criterion is of much higher relevance, when a new cell reference appears. Only a newly created real base station could explain this situation for a wireless communication device which is operating stationary for a certain minimum time in particular of a few days. Hence for stationary wireless communication devices it is another indication for increasing the rating of the second base station as fake base station.

According to another embodiment it is further proposed increasing the rating of second base station as fake base station in case of receiving from the second base station a later bandwidth support indication which shows less supported bandwidths than an earlier bandwidth support indication received from the first base station.

This embodiment in particular relates to LTE base stations, the so called eNodeBs. Typically a real eNodeB is supposed to support different bandwidths, in particular any one from 1.4, 3, 5, 10, 20 MHz. Usually each network operator sticks to some of the listed bandwidths, but mostly the bandwidths of 10 and 20 MHz are supported in order to serve more users in a cell. Fake base station however usually operates on 3 or 5 MHz, which is quite abnormal and rarely to find these with real network operators.

Hence this bandwidth support gives another indication, that here a fake base station is in proximity. Consequently the rating of the second base station as fake base station is increased as well.

With some or all of the suggested embodiments of the invention it is possible to reach a high reliability of rating an analyzed base station as fake base station or not. Preferably the several checks are carried out as long it is not sure that it is a real base station.

E.g. if a base station has a populated neighbor list it can practically ruled out that this base station is a fake base station. Hence it is preferable to stop continuing with the checks.

The handling of fake base station rating is preferably carried out by means of a state machine. Each indication like the ones mentioned before is handled as an alarm rose relating to an unexpected event. Each rising of an alarm is detected at the state machine and handled as abnormal behavior. When a certain number of alarms have been detected, in particular including a severity indication, then the second base station is rated as fake base station and the appropriate measures are taken, in particular rule this base station out for a reselection.

Should it despite the previously described checks happen that a reselection is carried out to a base station, which is a fake base station, there is still a chance for the wireless communication device to find that out. This is in particular advantageous as it allows the wireless communication device to take appropriate measures, e.g. to send a message on other channels or as last resort to switch on alarm light or horn, etc., instead of being completely clueless about being attached.

For doing so it is proposed in another embodiment a method wherein in case the wireless communication device carried out a cell reselection to the second base station, the method comprising the steps of:
  monitoring if the second base station transmits messages requesting at least one of:
  information from the wireless communication device,
  switch to lower generation cellular network, despite suitable signaling of current base station, in case such messages are received rating second base station as fake base station.

This embodiment refers to the behavior of a fake base station, mainly when a fake base station does not only have the goal to disable a wireless communication device, but additionally to detect the identity of the wireless communication device or more sensible information. Such requests comprises in particular device capabilities, including radio capabilities.

Receiving of such information which is compromising the user's privacy is in particular tried to achieve by sending information requests to the wireless communication device. By doing so the wireless communication device shall be instructed to provide information like co-ordinates, identities or capabilities, as part of the so-called measurement reports.

To such requested information in particular belong at least one of:
  RRC reconfiguration message,
  RRC redirection to lower generation networks,
  IMEI of the wireless communication device,
  IMSI of the wireless communication device,
  IMSI paging,
  positioning co-ordinates, and/or
  NAS reject messages.

The RRC (radio resource control) reconfiguration message is a message defined in the standard which allows a plurality of configuration of connection and to retrieve information from the wireless communication device in its response. Moreover with a RRC redirection message the fake base station also may redirect the wireless communication device to a base station of lower, and security-wise weaker, technologies.

The IMEI (international mobile equipment identity) identifies the wireless communication device globally in all cellular networks. To launch such a request would indicate to the wireless communication device the attempt to steal identities.

The IMSI (international mobile subscriber identity) identifies the subscription resp. the SIM card, and is also a part of the identity of the wireless communication device. With an IMSI request from the fake base station there is the risk the IMSI is provided to the attacker, which compromises identity of the subscription and eventually the user. So when this is identified, in particular directly after camping on the base station, it is a good reason to be suspicious. With IMSI paging the fake base station has the capability to locate the presence of the wireless communication device with a SIM card carrying that IMSI.

Also the instruction to use weak or no encryption algorithms is another indication.

In other words, when right after camping on a base station such information resp. instruction requests appears, this is another indication that it is a fake base station.

The same applies to a switch to a lower generation cellular network, in particular to 2G. As pointed out before this is forced by a RRC release message or by sending a NAS (non access stratum) reject messages. Those can be used in order to push a wireless communication device to another radio access network, in particular to 2G.

This in particular is suspicious when the signaling conditions of the current base station are good enough—which is for fake base stations usually the case as they tend to send with stronger signaling power, as indicated before. The attempt to push the wireless communication device to a 2G base station—which then probably is another fake base station—is an indication, as in 2G the problem of IMSI catchers was not solved, while 3G and 4G networks are supposed to be safe, at least as such. Hence a 4G fake base station is in this context only used as a kind of honeypot in order to forward the wireless communication device to a 2G fake base station.

This behavior is another indication that the wireless communication device was trapped by a fake base station. Consequently the then current base station needs to be rated as fake base station.

The set of messages listed above can be accepted even before authentication and security procedures making them a potential resource for attackers to communicate with wireless communication devices even without any credentials. The method applicable for handling the situation to have reselected to a fake base station observes and tracks the occurrence and timing of these messages inside the wireless communication device and accordingly rates the base station as fake or real.

Unlike the situation when the reselection has not yet happened, the fake base station cannot simply be ignored. It is hence proposed a method further comprising in case of rating the second base station as fake base station the step of sending an alert message to at least one of:
  the cellular network via the first base station, and
  at least one other wireless communication device connected by means of a device-to-device communication link.

Typically it is with standard compliant methods not simply possible to leave the fake base station. Therefore it is proposed to take measures in case the currently active base station is unmasked as being a fake base station. It strongly depends upon the type of application where the wireless communication device belongs to, e.g. is it a stationary or mobile device, is it a security relevant or commodity device, and which other connections are available.

The proposed method in particular relates to a stationary security relevant wireless communication device. If possible it is tried to get back to the previous base station. For this it is in particular foreseen to completely unregister and register again on the first base station. For that the cell ID of the fake base station needs to be stored and in the phase of registration ruled out for camping resp. registration.

If this takes too long, or is not possible with the present standard measures, but when another communication link is available, then it is preferred to use said communication link to send an alert message. This is in particular preferable for a home alarm system, where it is assumed that trapping the home alarm system has exactly the purpose to enter a house. Hence an alarm message would not be overreacted.

According to a second aspect of the invention it is proposed a wireless communication device configured to operate in a cellular network comprising a plurality of base stations, the wireless communication device further comprising transceiver circuitry for operating in association with a first base station, said transceiver circuitry is configured to determine further suitable base stations, the wireless communication device further comprising processing circuitry configured to, in case transceiver circuitry determined at least one second base station different from the first base station:
- check if cell identifier of the second base station is listed in a neighbor cell list received from the first base station,
- check signaling power of second base station,
- rate second base station as fake base station in case measured signaling power is significantly higher than the signaling power of the first base station, and the cell identifier of the second base station is not listed in said neighbor cell list, in case the rating of the second base station as fake base station is above a predetermined threshold, the processing circuit is configured to discard second base station from list of suitable base stations.

Such wireless communication device is in particular a machine type communication device equipped with communication circuitry, in particular a machine-to-machine-module. Then it is preferably the machine-to-machine module which holds computer programs that carry out the mentioned operations. The communication circuitry comprises at least transceiver circuitry and processing circuitry. In certain wireless communication devices the processing circuitry may also be situated outside of the communication circuitry that is part of the normal processing part of the wireless communication device.

The second aspect shares the advantages of the first aspect of the invention.

As it is shown this invention advantageously solves the depicted problem and indicates solutions for reliably avoiding a fake base station and, if this should not be applied or not be sufficient, to figure out if the wireless communication device was trapped, and to take appropriate measures.

BRIEF DESCRIPTION OF THE DRAWINGS

The following description and the annexed drawings set forth in detail certain illustrative aspects and are indicative of but a few of the various ways in which the principles of the embodiments may be employed. Characteristics and advantages of the present invention will appear when reading the following description and annexed drawings of advantageous embodiments given as illustrative but not restrictive examples.

FIG. 1a schematically shows a wireless communication device 1 of the type to which the present invention is applied to as an embodiment. The wireless communication device 1 is shown in spatial relationship to a cell 7 of a cellular network 6. The cellular network is in particular supporting the long term evolution (LTE) technology standard, that is wireless communication devices supporting this standard are capable to operate with base stations (eNodeBs) of this cellular network. The base station 4 provides the counterpart on the air interface 3 between the wireless communication device 1 and the cellular network 6. The base station 4 is further connected to the core network 8 of the cellular network 6, which provides the communication connections to other devices, either via internet, or in the same or another cellular network.

Figure 1A:
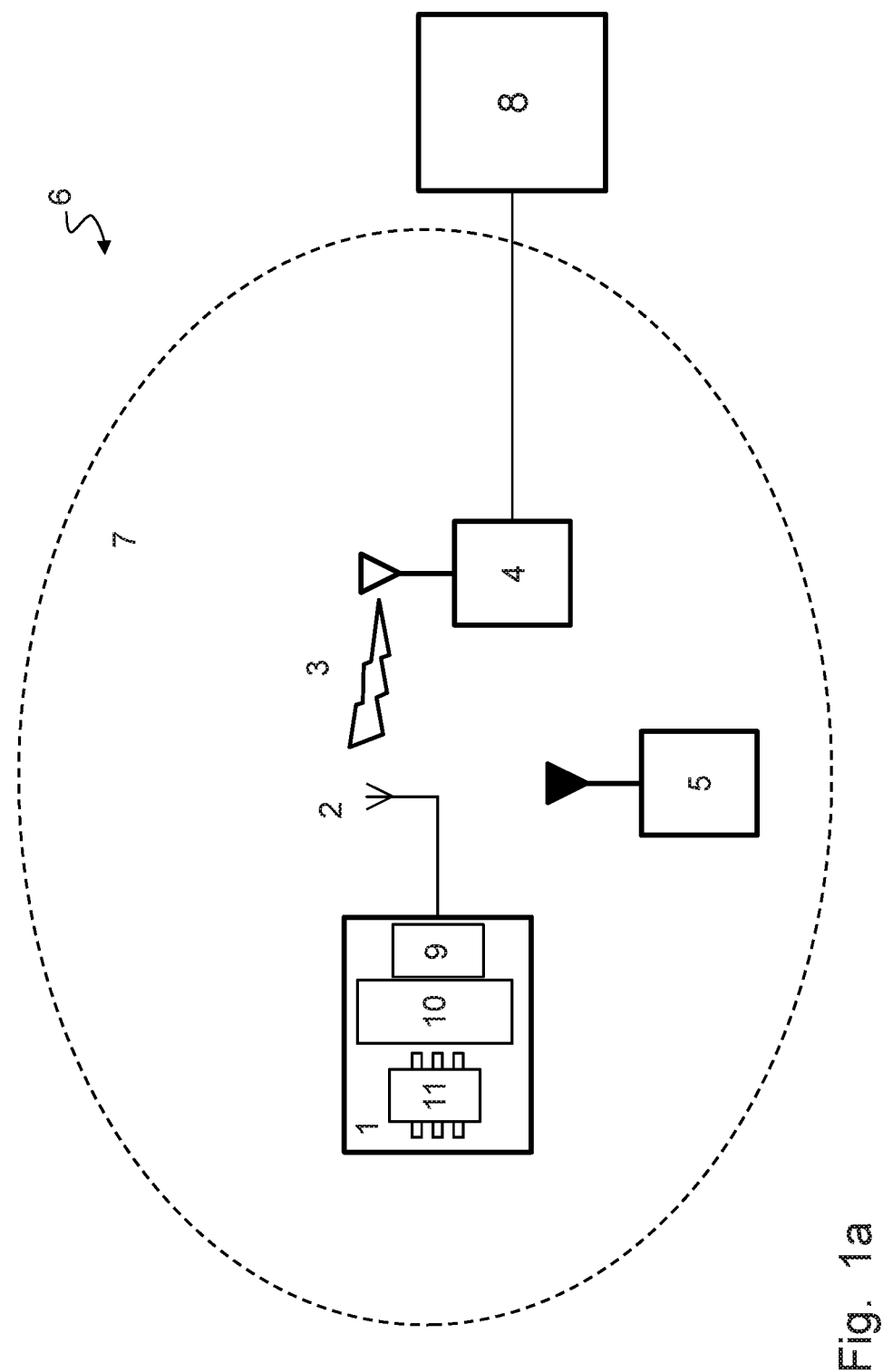
FIG. 1a shows a wireless communication device of the type to which the present invention is applied as an embodiment in conjunction with a fake base station.

The wireless communication device 1 is in this exemplary embodiment equipped with a processing circuitry 10, a transceiver circuitry 9 and a connected antenna 2. The processing circuitry 10 controls all operations of the wireless communication device 1, in particular those related to wireless transmissions over the air interface 3. Preferably the wireless communication device is equipped with a communication circuitry, which comprises processing circuitry and transceiver circuitry. Such communication circuitry is known as M2M module, resp. radio communication unit. In this case it is preferable that the wireless communication device comprises processing circuitry for controlling the transceiver circuitry and other processing circuitry for controlling the rest of the wireless communication device functions, like user interface, application logic etc. The processing circuitry for controlling transceiver circuitry holds computer readable programs for the respective technology standard protocol.

Further available in the coverage area of the cell 7 is a fake base station 5. This fake base station 5 behaves toward wireless communication devices as if it were a regular base station of a cellular network. Such fake base stations primarily records which wireless communication devices are in proximity of the fake base station and/or leave the camping wireless communication devices in the belief to camp on a normal eNodeB. Such fake base stations are commonly known as rogue eNodeBs.

In the situation shown in FIG. 1a the wireless communication device 1 is associated to base station 4. This in particular means the wireless communication device 1 is camping on the base station 4.

Figure 1B:
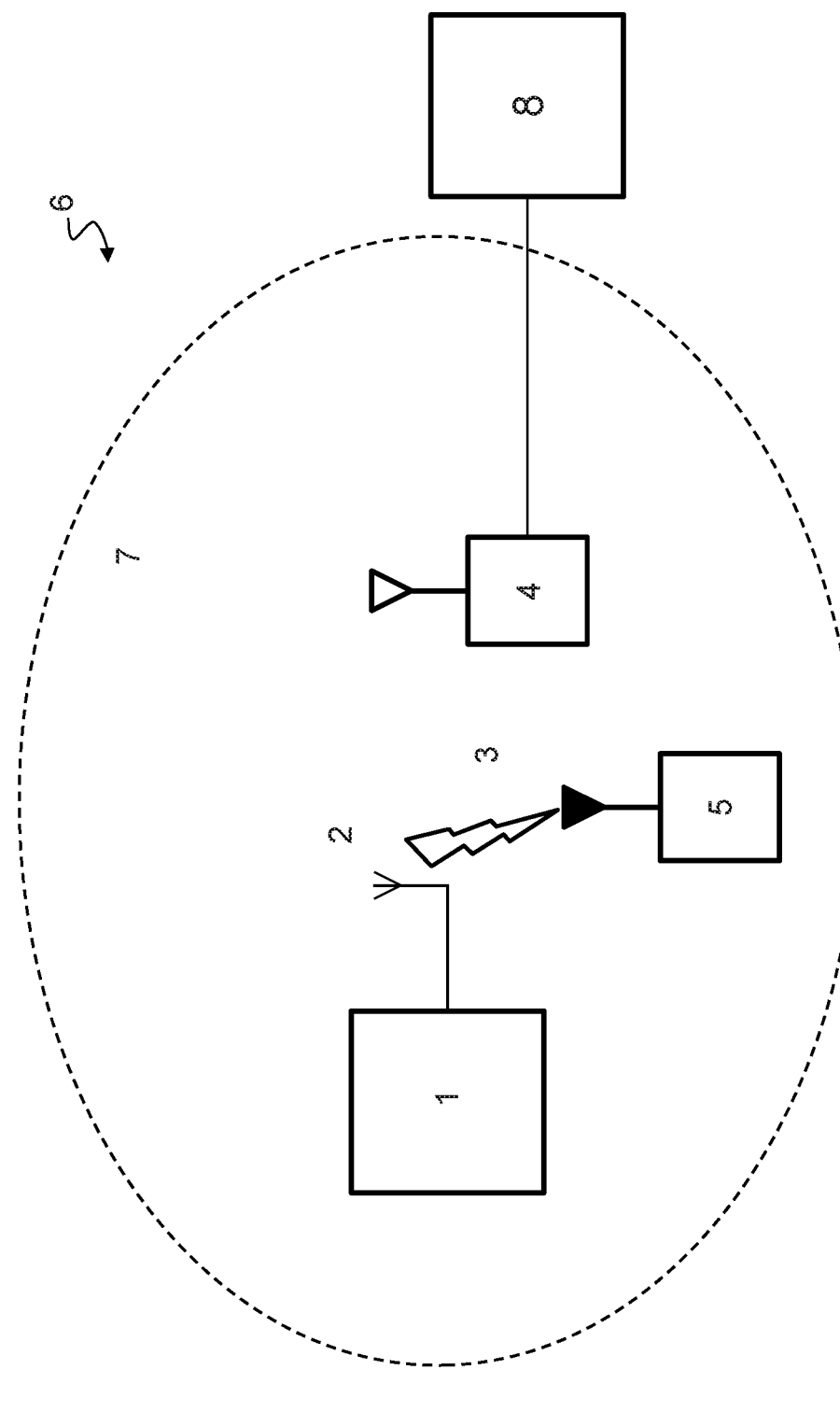
FIG. 1b shows a wireless communication device of the type to which the present invention is applied as another embodiment in conjunction with a fake base station in another relationship.

In contrast FIG. 1b shows the same situation with the only difference that here the wireless communication device 1 is already camping on the fake base station 5. For advanced embodiments, the wireless communication device 1 would even in case of an active connection not detect to be associated to a fake base station.

For the situation of FIG. 1a it is therefore a goal to avoid that e.g. in conjunction with a cell-reselection procedure the wireless communication device 1 selects the fake base station 5 for camping. For the situation of FIG. 1b it is a goal to find out that the wireless communication device is camping on a fake base station and to behave accordingly.

One typical example of a wireless communication device 1 which is prone to be caught by a fake base station is in particular a home security system. Such a system is—among potential other tasks—dedicated to launch via the cellular network an alarm message to a security center in case sensors in the house, e.g. at a window or door, detect an intruder.

Even if the fake base station is not able to decode the alarm message, it would fully suffice to disable the home security system, when it is camping on the fake base station without even knowing. An intruder could activate the base station with sufficient power, wait until the communication module of the home security system camps on the fake base station, and then open a window and enter the house. The home security system would diligently notice this intrusion, send a message via the fake base station and believe, it has done its job. But the message will never arrive at the security center.

This makes it clear that there is a need to uncover the fake base station preferably before the wireless communication device is camping on it. But even if it is too late, the wireless communication device could take alternative measures in order to call attention of a hazardous situation.

FIG. 2(a+b) shows a flow chart of one preferred embodiment of the inventive method. The flow charts starts in step S1 with a wireless communication device which is camping on a base station. Camping in this context means that, in particular after powering on, the wireless communication device first selects an appropriate cellular network that it will register with. Then it selects a cell, resp. the base station of a cell, receives broadcasted information from this base station, in particular including the cellular network the base station belongs to and a cell ID, and then sends a registration request. When this is approved by the base station, the wireless communication device is operating in idle mode in association to this base station. This base station is called the serving base station.

In this embodiment the serving base station is a valid base station like base station 4 shown in FIG. 1a+b.

In step S2 the wireless communication device receives from the serving base station system information blocks (SIBs), which provide configuration and capability information for the base station. Typically system information are broadcasted over a couple of blocks, and at least comprise information relating to the identity of the cellular network, the base station resp. cell, and the tracking area. These respective information is mainly part of the SIB1, which is broadcasted in normal operation every 80 ms.

Preferably the wireless communication device stores cell identity (cell ID) information in a local memory 11, where a predetermined number of cell IDs of previously visited base station can be stored.

Preferably base stations visited more frequently than others are removed less likely from the memory 11 should the maximum number of stored cell IDs should be reached than those which are visited less frequently.

At least the content of the last read set of SIBs is preferably held in the memory 11 of the wireless communication device.

The wireless communication device then continues to operate with the serving base station, but—according to technology standard—regularly checks for base stations in proximity in order to find better suited cells. This operation is part of the general concept of mobility management and could lead to a cell reselection to the base station which provides the best suitability.

This concept is also the point of attack for the fake base station deployed, as a fake base station close to the wireless communication device with high signalling power tries to offer a better suitability than the current serving cell, and thus attract the wireless communication device to reselect to the fake base station.

When during step S2 and S3 a fake base station was situated in proximity to the wireless communication device, then in step S4 at least one new base station will be detected. Should no such new base station be detected the process flow branches to step S5 and the wireless communication device continues its normal operation.

The process flow bails out of this loop as soon as a new base station was detected in step S4.

When this is the case it needs to be figured out in the following step, if the new base station is one that could be reliably used for cell reselection, in particular, that is no fake base stations.

For a stationary wireless communication device this is all the more of relevance as here new base stations normally do only rarely appear. For that it requires changes in the network topology, in particular a new base station set up or activated near the wireless communication device.

Figure 2A:
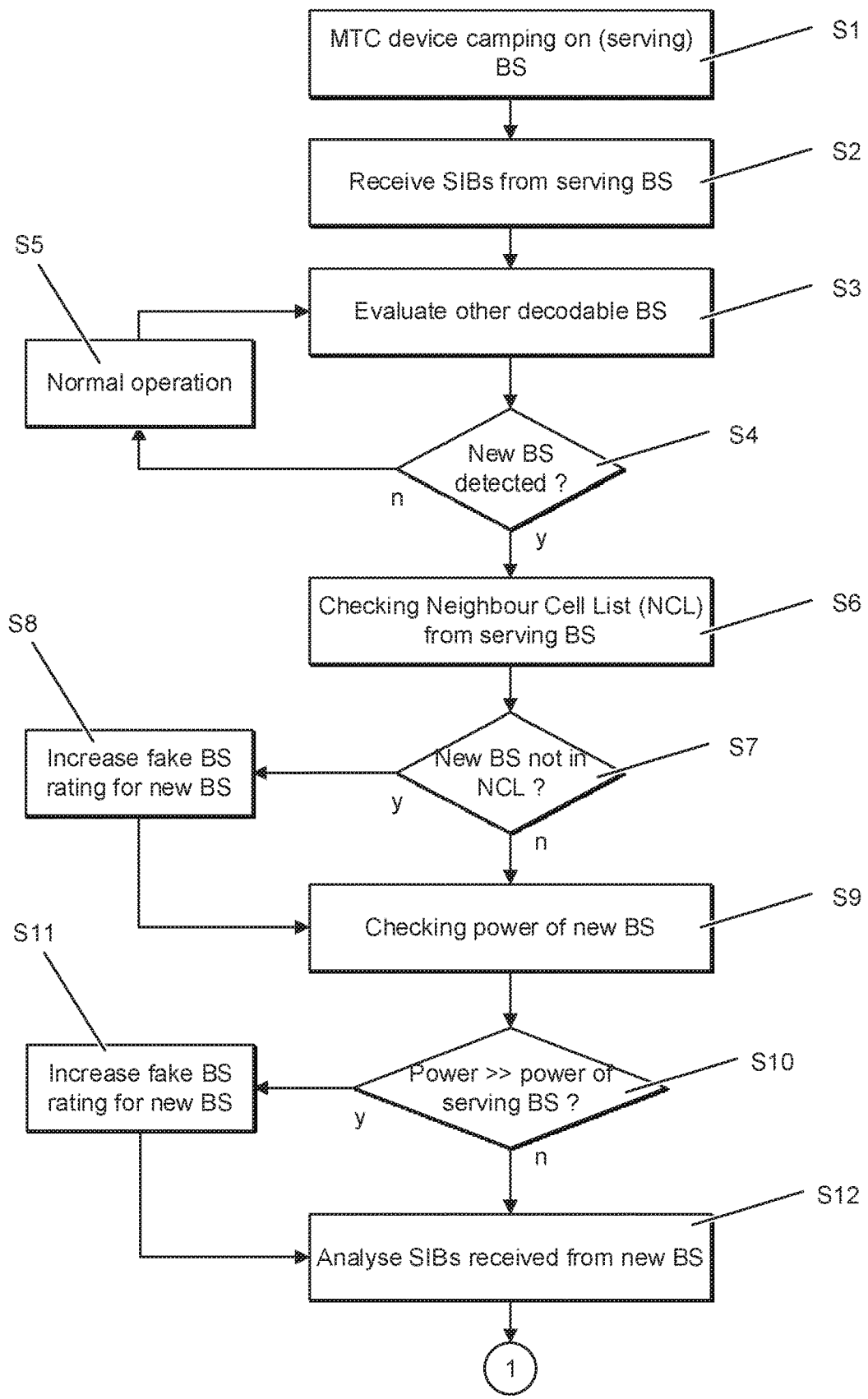
FIG. 2a+b shows a flow chart depicting one embodiment of the inventive method.

According to the exemplary embodiment shown in FIG. 2a, it is first checked in step S6 if the new base station is part of the neighbour cell list of the serving base station. Typically the neighbour cell list are part of the SIBs, in particular the SIB3 to SIB8, where INTRA frequency and INTER frequency as well as INTER-RAT cells, that means those of a different technology standard, are listed.

As the system information from the serving base station are held in memory, this information is available for the wireless communication device. Further with the new base station detection also a cell ID of the new base station is available.

For simple fake base station it is typical that they provide a fantasy cell ID. It is very unlikely that such a fantasy cell ID is by accident part of the neighbour cell list of the serving base station.

If this is the case is checked in step S7. If this the cell ID of the new base station is not found in the neighbour cell list the process flow branches to step S8, otherwise to step S9.

In step S8 a fake base station rating is increased. Such rating is preferably maintained by the wireless communication device with each base station which is evaluated for cell reselection following step S4.

In this exemplary process it is for this base station at step S8 set on a minimal value, like 0. If the new base station is not part of the neighbour cell list of the serving base station, then the fake base station rating of this base station is increased.

With the increase of the fake base station rating it is not necessarily clear, that the new base station is a fake base station. In particular a newly deployed eNodeB in an LTE network is according to the concept of the self-organising network (SON) not necessarily known to the neighbouring eNodeBs, and thus does not appear in their neighbour cell list. In particular for stationary wireless communication devices it is even very likely that a base station which is detected the first time, is newly deployed and therefore not part of the neighbour cell list either.

Hence it is advantageous to continue with more steps for adjusting the fake base station rating, now with step S9.

In this step it is checked the signal strength of the new base station. This signal strength is in particular measured by way of reference signal received power (RSRP) or wideband RSRP. One or both of it are measured in step S9 for the new base station.

When the signal strength of the new base station is significantly higher than of the serving base station, then this is another indication that here a fake base station is available. This is the case as the fake base station tends to make sure that it appears more suitable than the serving base station. Hence this fact shall arouse suspicion.

When the signal strength is significantly higher than the signal strength of the serving base station is a question of configuration and testing. A minor difference of a few percent is exactly in the range of what the mobility management is looking for. Hence starting from double digit percentage would be a good first estimate. It is important that the increase is instant in comparison with the surrounding base station. This is because the fake base stations are preferably adjusted that way that they are clearly operating with higher signal strength than the base stations in the surrounding.

Due to that in case of a significant higher signal strength of the new base station the process flow branches to step S11, where again an increase of the fake base station rating for the new base station is carried out.

If not, the process flow continues to step S12.

In a preferred embodiment the detection that the signal strength does not exceed could also be used for reducing the fake base station rating, in a way of bonus/malus system.

In step S12 the SIBs received from the new base station are analysed. This in particular means that the SIBs need to be received. As they are broadcasted, there is no need to initiate connection to the new base station in order to receive the SIBs. If this should not be the case by now, this is the perfect time to do so.

Figure 2B:
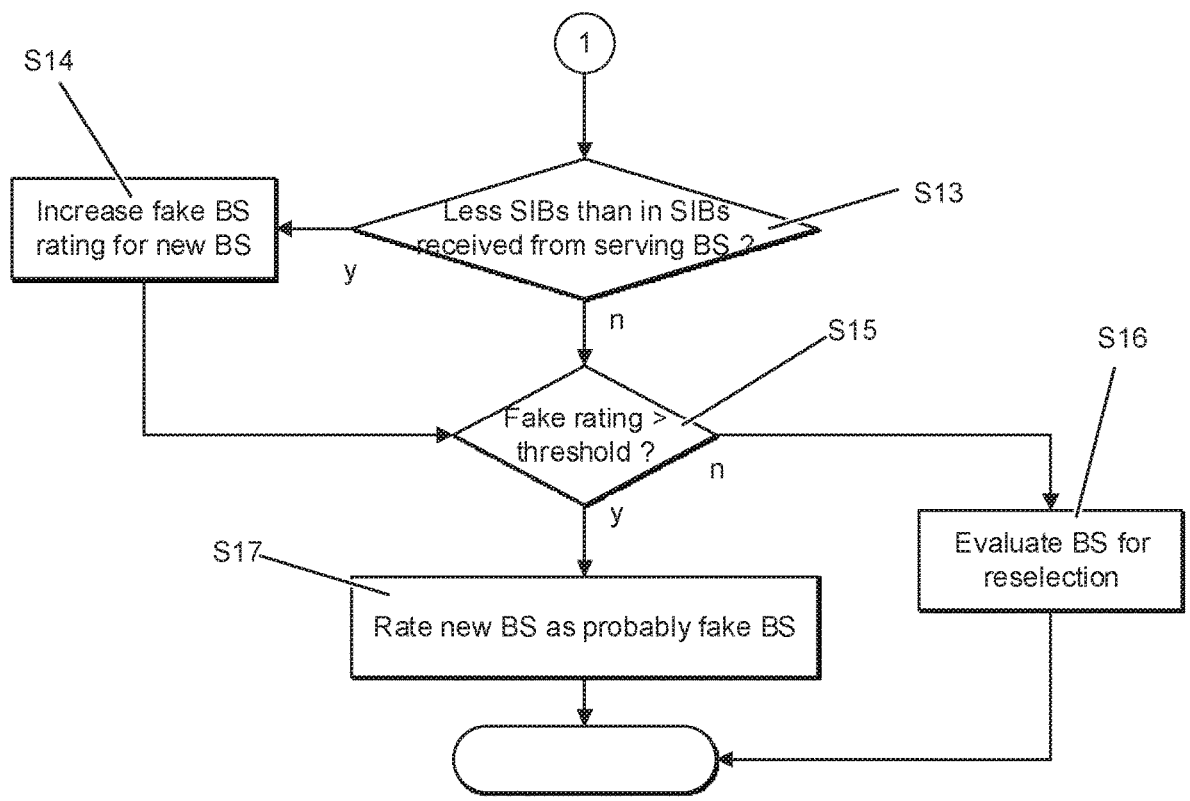

In FIG. 2b the process flow therefore continues with step S13. Here it is checked the content of the received SIBs from the new base station with that of the serving base station.

As part of this step the cell ID of the new base station is analysed. In particular when that cell ID is not stored in the memory for storing recently visited base stations of the wireless communication device, this is an indication that the new base station is a fake base station.

Further the tracking area ID received from the new base station is analysed. If it differs from the serving base station this could also be an indication that the new base station is a fake base station.

Further an empty neighbour cell list indicated by the SIBs from the new base station indicates that the new base station is a fake base station.

Additionally the SIB's broadcasted by the new base station might be partially filled, inaccurate and incomplete. This in particular refers to SIB fields relating to Intra-Frequency Measurement. If such field is equipped with a low value, then Intra-Frequency Measurement is prevented for the wireless communication device to look for other base stations.

Moreover the situation could occur that the second base station omits the SIBs, like those required for idle mode procedures such as cell reselection and other parameters that allow a wireless communication device to select other radio access technology networks (RATs).

When at least one of these conditions holds true, then the process flow branches to step S14 where again the fake base station rating is increased. Otherwise the process flow proceeds to step S15.

In more elaborate embodiments further checks could be carried out, which harden the rating to come to a better reliability of the check. On the other hand as these steps needed to be carried out for each base station that is detected in step S4, it is further advantageous to find criteria for stopping the check, when it is clear, that the new base station is no fake base station, e.g. when it was previously successfully visited, and as such is listed in the visited cell ID memory.

In step S15 the fake base station rating is now compared to a predefined threshold. Should the new base station be not evaluated as fake base station, this base station is continued to be evaluated for reselection, in step S16.

Otherwise it is in step S17 ruled out for reselection and as such deleted from the candidate list of base stations for reselection. Preferably the cell ID is memorized in order to quickly detect in the next cycle e.g. at step S3, that this base station will be blocked for further processing.

As a matter of fact, still this evaluation is a question of likelihood, as certainly such fake base station try to run under the radar of elaborated fake base station detection methods. Hence it might be the case that the wireless communication device nonetheless carries out a reselection to a new base station, which in reality is a fake base station.

Figure 3:
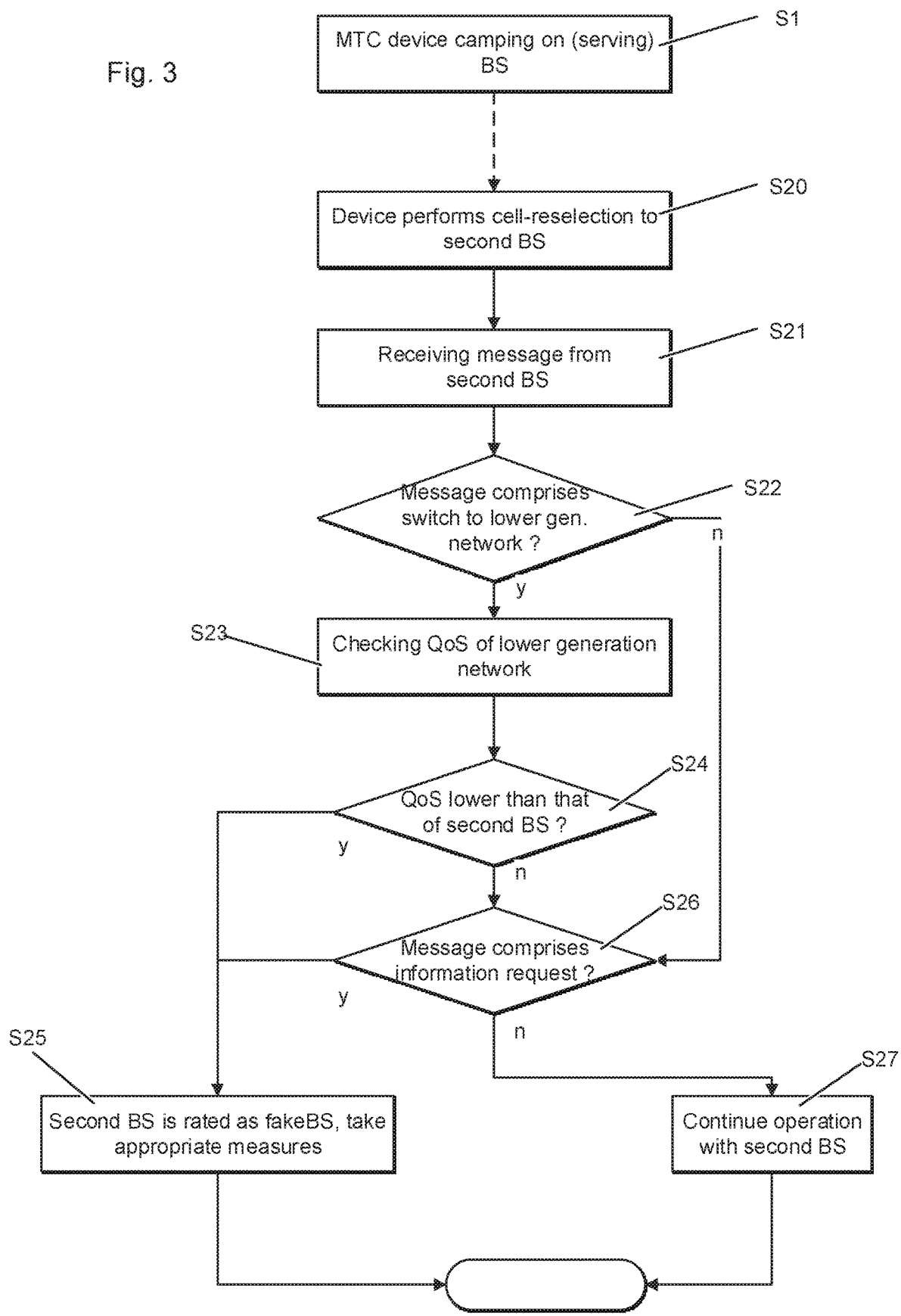
FIG. 3 represents a flow chart depicting another exemplifying embodiment of the inventive method.

In FIG. 3 is shown an exemplary embodiment of advantageous behaviour of the wireless communication device to detect this situation and take appropriate measures. It starts as in FIG. 2a with an MTC device camping on a serving base station in step S1.

During the following steps, should the second base station not provide a conspicuous behaviour—or the wireless communication device has not implemented the embodiment shown in FIGS. 2a+b—then the second base station was chosen for reselection. Consequently in step S20 the reselection is carried out to the second base station.

The proposed method becomes in particular robust by the following procedure steps, as even if prior to a reselection to a base station it cannot be detected that it is a fake base station, it might still be the case. This is in particular the case due to the fact that before carrying out a reselection, only a limited set of characteristics of the base station are known to the wireless communication device. Basically only the broadcast and some layer-1 criteria, in particular signal strength and other physically measureable information are available.

Hence it is advantageous to provide the following method steps in order to react appropriately should the base station where the wireless communication device is now camping on, turn out to be a fake base station.

First in step S21, regardless if directly after cell-reselection or when a certain time—including other operations in between—has passed, it is detected that the second base station sends request messages to the wireless communication device.

This is preferably the trigger point for the wireless communication device to be cautious with regards to the now active base station. Hence in step S22 it is first checked if the message comprises an instruction to switch to a cellular network of a lower generation technology standard, in particular to GSM.

Typically a wireless communication device operating in idle mode is deciding on its own on which kind of operating. When the active base station, in particular right after a reselection, tries to push the wireless communication device to a lower, in particular GSM base station, this might be an indication that the currently active base station is a fake base station with the goal to catch wireless communication devices in higher standards and push them to GSM, where no means against IMSI catchers are available.

Should the message not comprise such a switch instructions the process flow branches to step S26.

Otherwise the wireless communication device will in step S23 check the quality of service of the lower generation cellular network, where the second base station instructed the wireless communication device to switch to. The quality of service in particular comprises signal strength, signal to noise ratio (SNR), radio link failure rate, or a combination of some or all of these criteria. For a comparison, complementing criteria for the current radio access network of current base station are also determined.

In step S24 it is then compared the QoS of the lower generation cellular network to that of the current cellular network. If the QoS of the lower generation cellular network is higher, then this is an indication that the instruction from the second base station has a good reason. Hence the process flow switches to step S26. Otherwise the process flow switches to step S25. This finding is sufficient to rate the currently active base station as a fake base station, and it is hence necessary to take appropriate measures.

The appropriate measures are depending upon the capabilities of the wireless communication device. At least the wireless communication device should stop operating with the fake base station. Hence, the registration needs to be stopped. If this is possible by carrying out a reselection to the previous base station is a question of standard compliance. A power down and re-start with a selection of a base station for first registration, wherein the detected fake base station is ignored should in any case be helpful.

Should the wireless communication device have other communication means, like a landline or LAN resp. WIFI connection, then this connection can be used for potential warnings. It is recommended to send out a warning to a security center, when a fake base station is detected.

Further the wireless communication device preferably puts itself in response to the fake base station detection in the situation to deploy an acoustic and/or optic alarm in order to warn inhabitants on such legacy ways about the threat of an intruder.

In the case where no such switch instruction message is received, the process flow branches to step S26. Here it is checked whether the received message comprises information requests. If this is not the case the process flow branches to step S27 that is the wireless communication device continues operating with the second base station. It is therefore assumed that the currently active base station is no fake base station, until no other evidence appears. Here also further investigations or criteria can be checked, which are not described in the current embodiment.

Such information request preferably comprises a request for information of identifiers assigned to the wireless communication device, in particular the IMEI or IMSI of the wireless communication device or positioning co-ordinates. Additionally a RRC reconfiguration message or a NAS reject messages could cause suspicion. When such information messages are responded by the wireless communication device, the user's privacy is compromised and valid user credentials are disclosed to the attacker.

Further with a NAS reject message can indicate to the wireless communication device, in particular when special causes are indicated, that the wireless communication device is forced to switch to lower generation cellular networks, in particular 2G or even in an emergency mode. With the emergency mode all mobile services for the wireless communication device are denied, and effectively this is a denial-of-service attack. Typical causes indicated in the NAS reject message are "EPS service not allowed" or "EPS and non-EPS Service not allowed".

Should such a message appear the process flow again branches to step S25 for taking appropriate measures as set out above. Again, also a cumulation of indications for the presence of a fake base station is foreseen as part of this invention, hence for getting a solid rating and avoiding false alarms but also false positives.

In the above detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described here in connection with one embodiment may be implemented within other embodiments without departing from the scope of the invention. In addition, it is to be understood that the location or arrangement of individual elements within each disclosed embodiment may be modified without departing from the scope of the invention. The above detailed description is, therefore, not to be taken in a limiting sense, and the scope of the present invention is defined only by the appended claims, appropriately interpreted, along with the full range of equivalents to which the claims are entitled.

The invention claimed is:

1. Method for operating a wireless communication device configured to operate in a cellular network comprising a plurality of base stations, the wireless communication device operating in association with a first base station,
   the method comprising the steps for the wireless communication device of:
      determining further suitable base stations,
      in case at least one suitable second base station different from the first base station is found,
         checking if cell identifier of the second base station is listed in a neighbor cell list received from the first base station, and
         checking signaling power of second base station,
         rating the second base station as a fake base station in case measured signaling power is significantly higher than the signaling power of the first base station, and the cell identifier of the second base station is not listed in said neighbor cell list,
         further increasing the rating of the second base station in response to receiving, from the second base station, an indication of a plurality of supported bandwidths of the second base station, which shows less supported bandwidths than a plurality of supported bandwidths of the first base station, wherein the plurality of supported bandwidths of the second base station is a subset of the plurality of supported bandwidths of the first base station,
      in case of the rating of the second base station as a fake base station is above a predetermined threshold:
         discarding the second base station from a list of suitable base stations.

2. Method according to claim 1,
   the wireless communication device having memorized a set of system information blocks received from the first base station,
   the method further comprising the step of:
      retrieving a set of system information blocks broadcasted by the second base station, and increasing the rating of the second base station as a fake base station, when a tracking area identifier received with the set of system information blocks is different from a tracking area identifier received from the first base station.

3. Method according to claim 2,
   further increasing the rating of the second base station as a fake base station in case of receiving with the set of system information blocks from the second base station an empty neighbor cell list.

4. Method according to claim 2,
   further increasing the rating of the second base station as a fake base station in case of receiving with the set of system information blocks capabilities from the second base station which materially differ from capabilities contained in the set of system information blocks received from the first base station.

5. Method according to claim 4,
wherein a material difference is present when at least one of the set of system information blocks received from the first base station is missing in the set of system information blocks received from the second base station.

6. Method according to claim 1,
wherein the wireless communication device comprises a memory and is further configured to write in memory a cell reference of each base station the wireless communication device camped on,
further comprising the step of increasing the rating of second base station as a fake base station in case of receiving a cell reference of the second base station which is not stored in said memory.

7. Method according to claim 1,
wherein in case the wireless communication device carried out a cell reselection to the second base station, the method comprising the steps of:
monitoring if the second base station transmits messages requesting a switch to lower generation cellular network, despite suitable signaling of current base station,
in case such messages are received rating second base station as a fake base station.

8. Method according to claim 1,
wherein in case the wireless communication device carried out a cell reselection to the second base station, the method comprising the steps of:
monitoring if the second base station transmits messages requesting information from the wireless communication device,
wherein said requested information from the wireless communication device comprises at least one of:
RRC reconfiguration message,
RRC redirection to lower generation networks,
IMEI of the wireless communication device,
IMSI of the wireless communication device,
IMSI paging,
positioning co-ordinates, and/or
NAS reject messages.

9. Method according to claim 1, further comprising in case of rating the second base station as a fake base station the step of sending an alert message to at least one of:
the cellular network via the first base station, and
at least one other wireless communication device connected by means of a device-to-device communication link.

10. Wireless communication device configured to operate in a cellular network comprising a plurality of base stations, the wireless communication device further comprising transceiver circuitry for operating in association with a first base station, said transceiver circuitry being configured to determine further suitable base stations, the wireless communication device further comprising processing circuitry configured to, in case transceiver circuitry determined at least one second base station different from the first base station:
check if a cell identifier of the second base station is listed in a neighbor cell list received from the first base station,
check signaling power of the second base station,
rate the second base station as a fake base station in case measured signaling power is significantly higher than the signaling power of the first base station, and the cell identifier of the second base station is not listed in said neighbor cell list,
further increase the rating of the second base station in response to receiving, from the second base station, an indication of a plurality of supported bandwidths of the second base station, which shows less supported bandwidths than a plurality of supported bandwidths of the first base station, wherein the plurality of supported bandwidths of the second base station is a subset of the plurality of supported bandwidths of the first base station,
in case the rating of the second base station as a fake base station is above a predetermined threshold, the processing circuit is configured to discard the second base station from list of suitable base stations.

11. Wireless communication device according to claim 10,
wherein the transceiver circuitry is further configured to retrieve a set of system information blocks broadcasted by the second base station,
wherein the processing circuitry is configured to increase the rating of the second base station as a fake base station, in case of determining at least one out of the group of:
receiving a tracking area identifier with a set of system information blocks different from the tracking area identifier received from the first base station,
receiving an empty neighbor cell list with the set of system information blocks.

12. Wireless communication device according to claim 10,
wherein the transceiver circuitry is further configured to memorize a set of system information blocks received from the first base station,
and to receive a set of system information blocks from the second base station,
and the processing circuitry is configured to increase the rating of the second base station as a fake base station, in case at least one system information block received from the first base station is missing in the set of system information blocks received from the second base station.

13. Wireless communication device according to claim 10, further comprising a memory,
wherein the processing circuitry is configured to write in a memory a cell reference of each base station the wireless communication device camped on,
and to increase the rating of the second base station as a fake base station in case the cell reference received from the second base station is not stored in said memory.

14. Wireless communication device according to claim 10,
wherein in case the wireless communication device carried out a cell reselection to the second base station, the transceiver circuitry is configured to monitor if the second base station transmits messages requesting at least one of:
information from the wireless communication device,
switch to lower generation cellular network, despite suitable signaling of current base station, in case such messages are received the processing circuitry being configured to rate the second base station as a fake base station.

15. Wireless communication device according to claim 14,
wherein the transceiver circuitry is configured to send an alert message to at least one of:
the cellular network via the first base station, and
at least one other wireless communication device connected by means of a device-to-device communication link,
in case of rating the second base station as a fake base station.

\* \* \* \* \*